Figure 1:
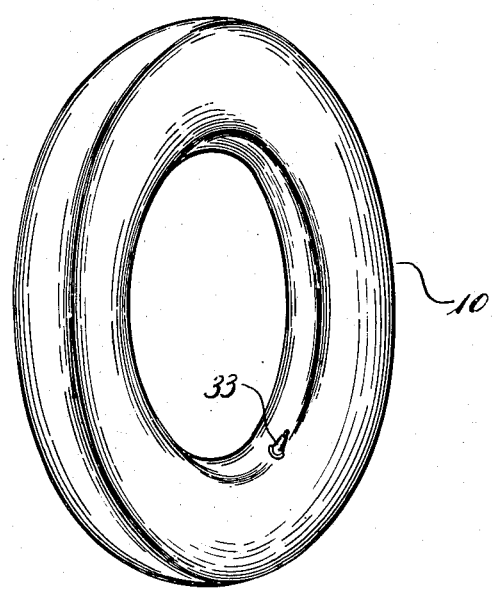

Patented Aug. 10, 1954

2,685,905

UNITED STATES PATENT OFFICE 2,685,905

SAFETY INNER TUBE

Henry K. Chandley, Dayton, Ohio, assignor to The Firestone Tire & Rubber Company, Akron, Ohio, a corporation of Ohio Original application June 16, 1947, Serial No. 754,993, now Patent No. 2,514,183, dated July 4, 1950. Divided and this application June 2, 1950, Serial No. 176,932

2 Claims. (Cl. 152—342)

1

This invention relates to safety tubes for pneumatic tires of the type having a plurality of compartments, an inner and outer compartment in the present instance.

Pneumatic tire inner tubes now in general use are of a single tube type. In the event of a tire blowout, or a large rupture of the wall of a single compartment tube when such tube is in service the tire in which it is mounted will abruptly collapse. If, at the time the tire collapses, it is in service on a fast moving automobile, there is danger that the automobile on which it is mounted will go out of control of its driver and cause a serious wreck.

To reduce to a minimum the danger to occupants of automobiles and property damage from sudden, or quick collapse of pneumatic tires in service, tire engineers, heretofore, have provided inner tubes with multiple air compartments. One such type tube now commercially available, comprises an inner and an outer air compartment so constructed that when the outer compartment loses its air pressure and collapses, the inner compartment will sustain the load on the tire, in which it is mounted, for sufficient time for a driver to bring a fast moving automobile safely to a stop. However, until the present invention, none such tubes have proven entirely satisfactory. One fault of the prior art was the high cost of the finished tube. Another fault of tubes heretofore commercially available was that the wall of the inner compartment of the tube was at least partially vulcanized before it was attached to the wall of the outer compartment which made it very difficult, if ever possible, to obtain a good union between the walls of the inner and outer compartment at their base portions. Upon the advent of high speed automobiles having sensitive steering controls, both dynamic and static balance of front wheels became an important requisite in avoiding shimmying of these wheels. A serious objection to safety tubes having an inner and an outer compartment has heretofore been that when installed they often threw wheels out of balance due to the out of balance of the tubes. A factor in causing the out of balance of such tubes was the wilting or drooping of the walls of the inner compartment during molding and vulcanization of the tubes.

An object of the invention is to provide a safety tube having an inner and an outer compartment whose longitudinal center lines lie in a plane dividing the tube base circumferentially in half and being at a right angle to the axis of the tube.

Another object of the present invention is to

2 provide a safety tube with inner and outer compartments wherein each compartment is formed of a complete tube.

Another object of the invention is to provide a plural compartment tube having an improved union between the base portions of tubes forming the compartments.

Yet another object of the invention is to provide a multiple chamber safety inner tube so constructed that it may be cured with internal steam and substantially drained dry of condensate.

Figure 2:
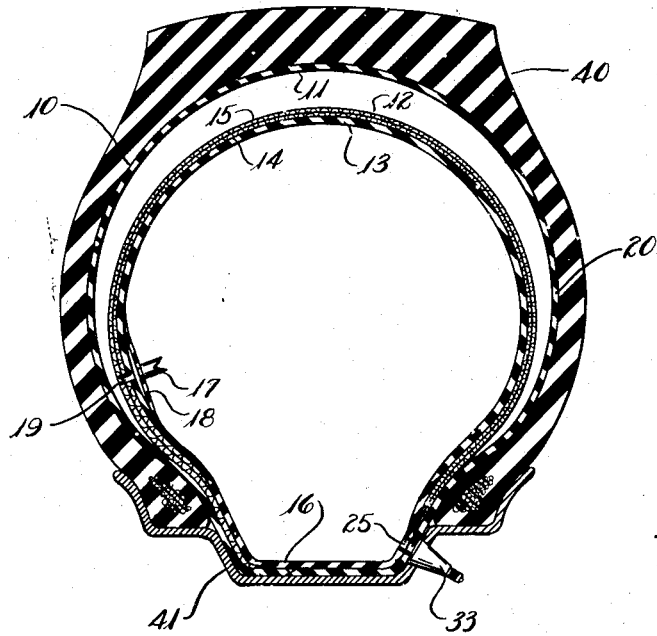

Other objects and advantages will become apparent from the following description taken in conjunction with the accompanying drawings:

Fig. 1 is a perspective view of a finished tube embodying the present invention, and Fig. 2 is an enlarged sectional view of the tube of Fig. 1 shown mounted in a tire on a tire rim with the tube inflated.

This application is a divisional application of my Patent No. 2,514,183 to which reference is made for a disclosure of the method of making the tube described and claimed herein.

By reference to the drawing it will be seen that the invention comprises a complete outer tube 11 and a complete tube 12 lying entirely within tube 11. Tubes 11 and 12 have a common axis and are adjoined in fluid-tight relation along their radial inner or base portion to an extent sufficient to extend from bead to bead of a tire mounted on its rim and in which tube 10 is adapted to be mounted and run in service. The tube 12 comprises two plies of rubberized cord tire fabric 14 and 15, the cords of which extend angularly transversely of the plies. Ply 15 is narrower than ply 14 and is disposed centrally thereof resulting in a step-off of approximately ⅜" between the edges of said plies. A layer of rubber 13 covers the entire exposed radial inner surface of the assembled plies 14 and 15, said layer 13 extending a distance beyond the edges of said plies. A rubber base strip 16 with its edges overlapping the edges of layer 13 closes the opening between the edges of layer 13 forming a base portion of tube 12. Strip 16 is of greater thickness than layer 13. A thickness of .020" for layer 13 and .060" for strip 16 has been found satisfactory for a 6.00–16 tube. Applicant provides an extent of rubber base between the edges of said rubberized fabric plies of approximately 4" for said 6.00–16 tire. Since 6.00–16 tires are mounted on rims 4" between their tire bead flanges, it will be seen that said rubber base will extend from bead to bead of a tire when said tube is run in service.

A molded rubber flutter valve 17, having a base 18, is attached to layer 13, with a longitudinally extending hole through valve 17 aligned with a valve hole 19 through the layer 13 and plies 14 and 15 of tube 12.

The outside tube 11 comprises a continuous wall of rubber 20 which completely encloses tube 12 and adjoins strip 16 of tube 12 in fluid-tight relation therewith. Tube 11 has a greater cross-section contour than tube 12, resulting in a substantial spacing of these tubes at their crown portions as will be seen by reference to the drawing.

A tire tube valve 33, which may be of conventional type, is attached to the assembled tubes 11 and 12 centered over a hole 25 passing through the strip 16 of tube 12 and the base of wall 20 of tube 11 at a point where said strip and base of wall 20 are in fluid-tight relation. Valves 17 and 33 are in substantial alignment transversely of tube 10, such alignment making possible evacuation of condensed steam or other liquid from between tubes 11 and 12, which liquid is present in the event the tube is vulcanized by steam inside the tube as explained by said patent.

In operation, tube 10 is mounted in a tire 40, and the tire mounted on a rim 41 as will be seen by reference to Fig. 3. The tire inflationary pressure is obtained by inflating tube 10 with air under pressure as by the use of the usual service station air chuck and air hose connected to a suitable source of air supply. The wall of tube 12 is substantially impervious to air, but the opening through flutter valve 17 is such as to permit inflationary air received through said chuck and valve 33 to pass into the space between the tubes 11 and 12 without building up differential air pressure between said tubes. However, in the event of a tire blowout or other sudden or rapid deflation of the space between tubes 11 and 12, there will be a rush of air through said flutter valve which results in the valve fluttering shut and sealing off the air remaining within tube 12, which latter tube will then function as an auxiliary load-carrying member as is well known by those familiar with safety tubes such as disclosed by my previously referred to patent.

What is claimed is:

1. An inflatable fluid container of the class described adapted to be inserted in and removed from a tire casing as a unit, comprising two concentric tubes having separate bases, said bases being composed of rubber only, one said tube being of smaller cross-section than the other and being disposed within the larger tube, the outer of said tubes being substantially composed of rubber to permit expansion under internal inflation pressure, the inner of said tubes being composed of rubber reinforced with fabric, the bases of said tubes being permanently joined in fluid tight relation throughout their circumferential extent in an area extending substantially from bead to bead of a tire in which said container may be mounted when in service, each said base having at least one lapped splice extending circumferentially thereabout, said splices in said separate bases being offset laterally within said joined area of the bases, said bases having an inflationary valve disposed in the joined portions thereof.

2. An inflatable fluid container of the class described adapted to be inserted in and removed from a tire casing as a unit, comprising two concentric tubes having separate bases, said bases being composed of rubber only, one said tube being of smaller cross-section than the other and being disposed within the larger tube to form inner and outer circumferential chambers, said tube of smaller cross-section being formed of an annular sheet of rubber having its opposite edges joined together to form a circumferential lapped splice, the outer of said tubes being composed of an annular sheet of rubber having its opposite edges joined together to form a circumferential lapped splice, the rubber construction of said outer tube permitting expansion under internal inflation, the bases of said tubes being permanently joined together in fluid tight relation throughout their circumferential extent in an area extending substantially from bead to bead of a tire in which said container may be mounted when in service, said bases having an inflationary valve disposed in the joined portions thereof, the said circumferential splices of the inner and outer tubes being laterally spaced from each other within the permanently joined circumferential area of the bases of the inner and outer tubes, and the inner and outer tubular chambers having a restricted passage therebetween, the inner of said tubes being composed of rubber reinforced with fabric so as to possess sufficient rigidity to retain the portion of the inflationary air contained therein, at least temporarily, to support the load on the tire in the event of a blowout of the outer chamber.

References Cited in the file of this patent

UNITED STATES PATENTS

| Number | Name | Date |
|---|---|---|
| 1,962,143 | Ford | June 12, 1934 |
| 2,004,892 | Grieshaber | June 11, 1935 |
| 2,200,916 | Crowley | May 14, 1940 |
| 2,253,746 | Zimmerman | Aug. 26, 1941 |
| 2,308,955 | Wilson | Jan. 19, 1943 |
| 2,322,500 | Armstrong | June 22, 1943 |